United States Patent [19]

Davis

[11] Patent Number: 4,735,402

[45] Date of Patent: Apr. 5, 1988

[54] FLUID SUSPENSION SPRING AND DAMPENER FOR VEHICLE SUSPENSION SYSTEM

[75] Inventor: Leo W. Davis, Dallas, Tex.

[73] Assignee: Liquid Spring Investors, Ltd., Dallas, Tex.

[21] Appl. No.: 907,140

[22] Filed: Sep. 12, 1986

Related U.S. Application Data

[63] Continuation of Ser. No. 753,365, Jul. 5, 1985, abandoned, which is a continuation of Ser. No. 550,883, Nov. 9, 1983, abandoned.

[51] Int. Cl.$^4$ ............ F16F 5/00; F16F 9/30; F15B 15/22; F10K 15/00
[52] U.S. Cl. .................. 267/64.13; 92/9; 92/168; 137/513.3; 188/268; 188/276; 188/322.22
[58] Field of Search .......... 188/288, 284, 322.12, 188/322.15, 274, 275, 268, 281, 282, 315, 276, 264 R, 264 F, 322.22; 267/64.13, 64.15, 127; 280/714, 709; 138/43, 46; 137/513.3; 92/8, 9, 165 R, 86, 12, 168; 277/29, 30, 59, 135

[56] References Cited

U.S. PATENT DOCUMENTS

| | | | |
|---|---|---|---|
| 2,197,474 | 4/1940 | Johnson | 267/64.15 |
| 2,576,658 | 11/1951 | Werner | 188/88 |
| 2,670,816 | 3/1954 | Armstrong | 188/322.17 |
| 2,785,774 | 8/1957 | Long et al. | 188/88 |
| 2,840,000 | 6/1958 | Gramenzi | 137/513.3 X |
| 2,873,963 | 2/1959 | Taylor | 267/64.25 |
| 2,909,368 | 10/1959 | Taylor | 267/64.13 |
| 2,914,337 | 11/1959 | Kress | 280/96 |
| 2,930,608 | 3/1960 | Hogan et al. | 267/64.13 |
| 3,123,171 | 3/1964 | Kress | 180/73 |
| 3,190,400 | 6/1965 | Schultze | 188/274 |
| 3,204,945 | 9/1965 | Taylor | 267/64.13 |
| 3,218,051 | 11/1965 | Doetsch | 267/129 |
| 3,250,526 | 10/1966 | Kress | 267/64 |
| 3,303,856 | 2/1967 | Taylor | 138/31 |
| 3,361,422 | 1/1968 | Theulead | 188/281 X |
| 3,441,102 | 10/1966 | Kress | 180/22 |
| 3,618,928 | 11/1971 | Taylor | 267/124 |

(List continued on next page.)

FOREIGN PATENT DOCUMENTS

| | | | |
|---|---|---|---|
| 0526041 | 2/1954 | Belgium | 188/274 |
| 610938 | 3/1960 | Canada . | |
| 654141 | 12/1962 | Canada . | |
| 0032988 | 8/1981 | European Pat. Off. . | |
| 0739014 | 9/1943 | Fed. Rep. of Germany | 188/282 |
| 2310614 | 9/1974 | Fed. Rep. of Germany . | |
| 2351813 | 4/1975 | Fed. Rep. of Germany | 188/284 |
| 7501503 | 8/1975 | France . | |
| 7923126 | 4/1980 | France . | |
| 0191341 | 11/1983 | Japan | 188/276 |
| 949426 | 2/1964 | United Kingdom . | |
| 1043425 | 9/1966 | United Kingdom . | |
| 2108218A | 5/1983 | United Kingdom . | |

OTHER PUBLICATIONS

Burton, Ralph, "Steady Forced Vibration", Vibration and Impact (New York, Dover Publications), pp. 74–89, 108–129, 138–141.

Primary Examiner—Andres Kashnikow
Assistant Examiner—Robert J. Oberleitner
Attorney, Agent, or Firm—Hubbard, Thurman, Turner & Tucker

[57] ABSTRACT

A vibration isolating and damping suspension strut for vehicle undercarriages comprising an elongated cylinder and piston structure wherein the cylinder is divided into opposed chambers which are in communication with each other by passages formed in the piston and in a flow restricting shuttle valve mounted on the piston rod. When the strut undergoes a retraction stroke of the piston to absorb loads silicone fluid is compressed in the opposed chambers and transferred from the chamber opposite the piston rod to the rod side chamber through passages in the piston only. When the strut rebounds or extends its piston rod fluid is forced to flow through passages in the shuttle valve member and the piston flow passages at a more restricted rate. The piston flow passages and the shuttle valve are arranged to direct fluid flow toward the outer cylinder borewall to improve heat transfer to the exterior of the strut and minimize heating of the fluid contained in the cylinder chambers. Alternate embodiments of the suspension strut have spiral fluid transfer grooves formed on the periphery of the piston or on a cylinder sleeve insert member.

28 Claims, 5 Drawing Sheets

U.S. PATENT DOCUMENTS

| | | | |
|---|---|---|---|
| 3,726,368 | 4/1973 | Taylor | 188/316 |
| 3,794,309 | 2/1974 | Chrokey et al. | 267/34 |
| 3,795,291 | 3/1974 | Naito et al. | 188/274 |
| 3,820,818 | 6/1974 | Kress | 280/96 |
| 3,847,453 | 11/1974 | Herbert | 277/59 X |
| 3,876,044 | 4/1975 | Kendall et al. | 137/513.3 X |
| 3,937,450 | 2/1976 | Bauer | 267/113 |
| 3,947,004 | 3/1976 | Taylor | 267/64.13 |
| 3,957,140 | 5/1976 | Overkott | 188/322.15 X |
| 3,958,673 | 5/1976 | Allinquant et al. | 188/322.17 X |
| 4,265,344 | 5/1981 | Taylor | 188/322.17 |
| 4,268,045 | 5/1981 | Traub | 277/121 |
| 4,428,566 | 1/1984 | de Baan et al. | 267/64.15 |
| 4,474,271 | 10/1984 | Molders et al. | 188/282 X |
| 4,502,673 | 3/1985 | Clark | 188/322.15 |
| 4,535,876 | 8/1985 | Taylor | 188/311 |
| 4,561,641 | 12/1985 | De Young et al. | 188/268 X |
| 4,585,099 | 4/1986 | Taylor | 188/322.19 |
| 4,611,794 | 9/1986 | Taylor | 267/64.13 |
| 4,630,805 | 12/1986 | Taylor | 267/64.13 |

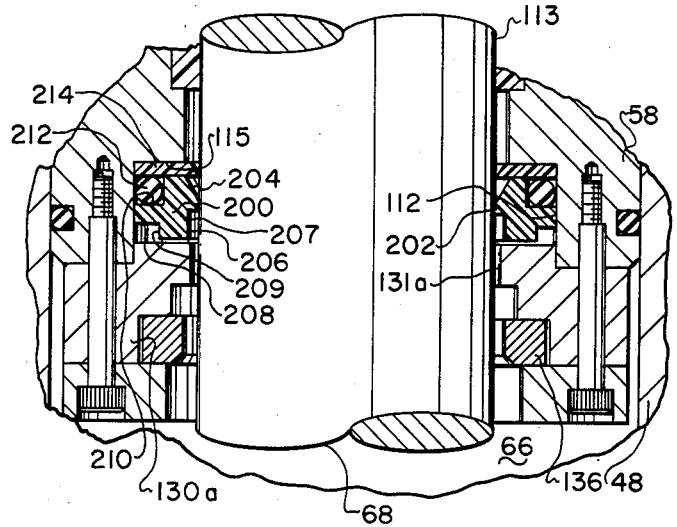
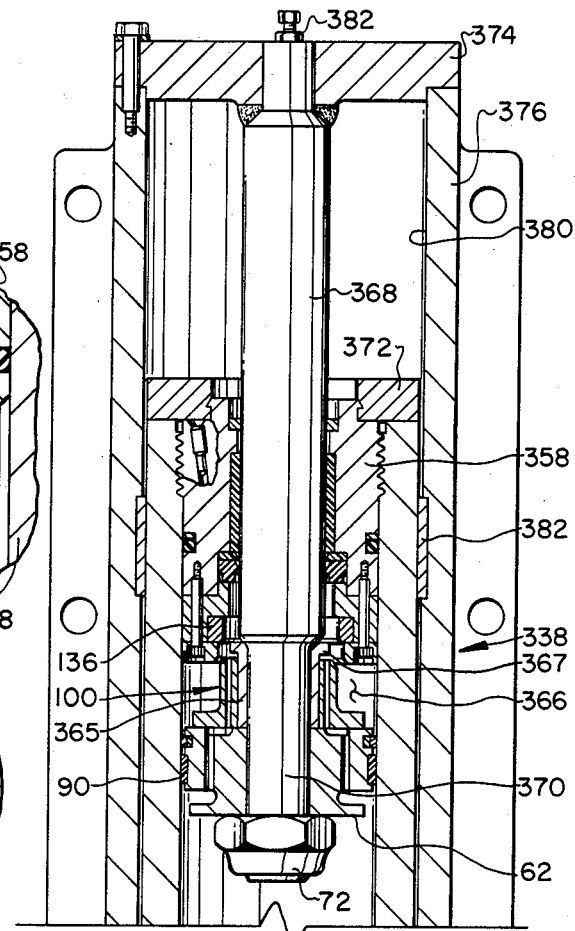
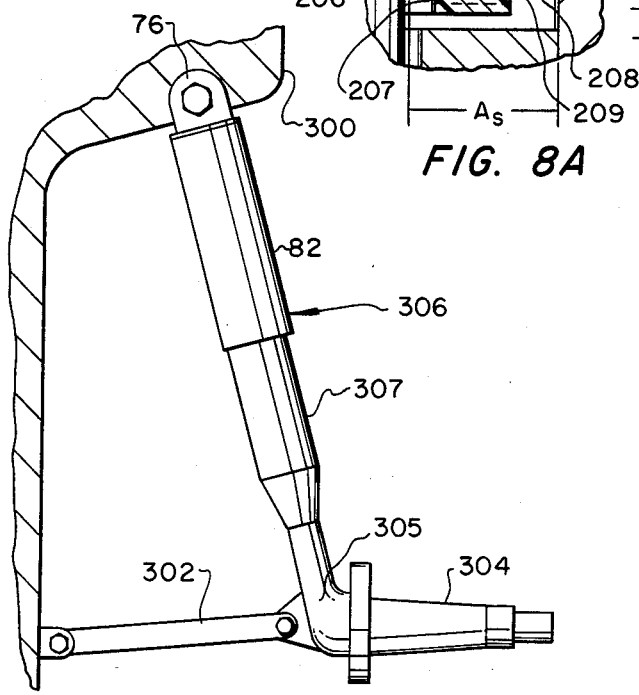
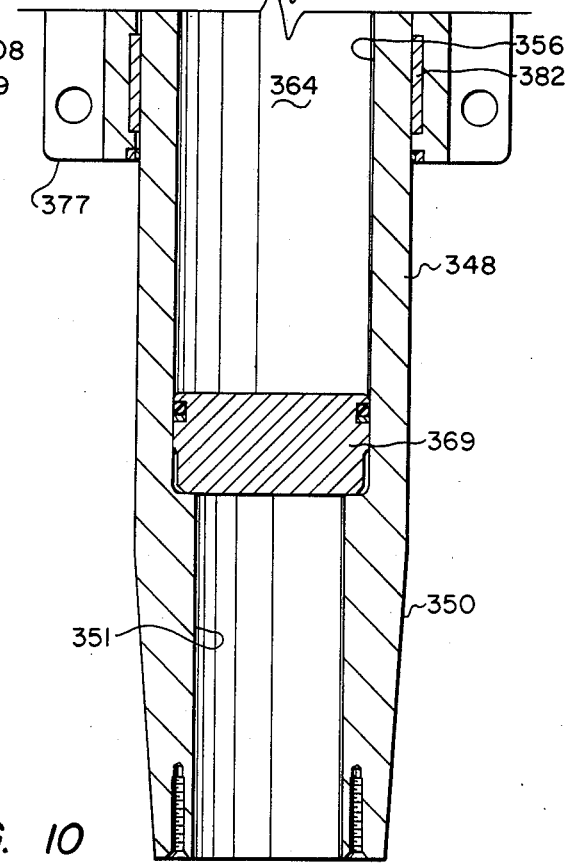
FIG. 8
FIG. 8A
FIG. 9
FIG. 10

FLUID SUSPENSION SPRING AND DAMPENER FOR VEHICLE SUSPENSION SYSTEM

This is a continuation of application Ser. No. 753,365, filed July 5, 1985, now abandoned, which is a continuation of application Ser. No. 550,883, filed Nov. 9, 1983, now abandoned.

BACKGROUND OF THE INVENTION

1. Field of the Invention

The present invention pertains to a combination telescoping piston and cylinder suspension spring strut and vibration dampener for vehicle suspension systems.

2. Background

In the art of vehicle suspension systems there have been several developments directed to improving the isolation of the vehicle frame from stresses and excursions of the vehicle resulting from uneven or rough roadway conditions and others factors inducing vibration in the vehicle undercarriage. Hydraulic, and/or combination pneumatic and hydraulic suspension mechanisms are desirable for several reasons including improved fatigue life of the mechanism, improved vibration damping characteristics and the contribution of the mechanism to flexibility in the design of the vehicle undercarriage and frame. However, prior art hydraulic suspension spring and vibration dampener mechanisms have disadvantages which have presented certain problems to the art worker.

One problem associated with known types of liquid filled piston and cylinder type suspension mechanism pertains to the build up of heat in the cylinder fluid as a result of inadequate dissipation of heat from the fluid volume contained within the cylinder. In all known liquid filled suspension mechanisms a moderate increase in temperature of the working fluid will cause thermal expansion resulting in changes in the ride height of the vehicle frame. Sufficient extension of the piston and rod structure may occur to a point where adequate stroking of the cylinder and piston cannot be accomplished under all vehicle operating conditions thereby resulting in possibly severe damage to the suspension system and other parts of the vehicle. Moreover, excessive extension of the suspension mechanism also results in over contraction or telescopic movement of the piston into the cylinder resulting in very severe fluid pressure conditions in the mechanism when hitting a rough terrain condition and thus creating higher loads on the fluid seals and the cylinder structure. The thermal loading found on prior art type liquid suspension mechanisms also contributes to degradation of the fluid seals causing leakage of fluid from the interior chambers of the mechanisms and ultimate failure of the mechanism or at least requiring frequent fluid recharging. Such characteristics are, of course, unwanted in vehicle suspension systems, but have heretofore not been dealt within a satisfactory manner.

One of the most severe vehicle suspension system applications is in relatively large off-highway trucks for hauling earth, mineral ores and various other materials and structures. Since this type of vehicle is expensive to manufacture and maintain and operates virtually at all times over very rough terrain, the provision of a spring and suspension dampening device having a suitable spring rate and being capable of complying with and dampening very severe shock loads on the vehicle is highly desired. The ability to provide a suspension spring and vibration dampener which will reduce stresses on the vehicle frame, the suspension components and tires, as well as permit increased vehicle operating speeds, can provide significant economic advantages.

Another problem associated with hydraulic cylinder and piston type vehicle suspension mechanisms, and actuators subject to similar pressures and force loadings, pertains to the provision of piston road seals which will suitably withstand the very high hydraulic pressures and the high rates of loading and unloading, or increase and decrease, respectively, of the fluid pressures. The provision of seals which will adequately prevent leakage of fluid over a satisfactory life span of the coponent without scoring the piston rod and without premature seal failure has been a longstanding problem and is particularly aggravated in applications where cyclical movement of a piston rod in a cylinder at relatively high rates is encountered. In accordance with the present invention, however, improved piston rod seals are provided which are particularly adapted for applications for sealing cyclically and severely loaded mechanisms such as liquid suspension and vibration dampener mechanisms.

SUMMARY OF THE INVENTION

The present invention provides an improved hydraulic suspension spring and vibration dampener mechanism particularly adapted for use in severe duty applications such as in the suspension systems of off-highway trucks and other vehicles.

In accordance with one aspect of the present invention there is provided a suspension spring and vibration dampening mechanism comprising a cylinder and piston apparatus which is filled with a compressible liquid, preferably a silicone composition, which has a suitable compressibility factor and the cylinder and piston are configured to provide for two opposed cylinder chambers divided by the piston member wherein fluid may be transferred directly between the opposed chambers in a high rate cyclic manner without increasing the temperature of the spring fluid significantly.

In accordance with another aspect of the present invention there is provided a suspension and vibration dampening mechanism of the hydraulic cylinder and piston type wherein fluid is transferred between chambers in the cylinder member in such a way as to provide improved heat transfer from the fluid to the exterior of the cylinder and to prevent substantial mixing of the transferred fluid with the main body of fluid in the cylinder.

In accordance with a further aspect of the present invention there is provided a unique cylinder and piston type suspension spring mechanism having an improved liquid valving arrangement wherein resistance to transfer of liquid between opposed chambers in the cylinder is controlled to dampen oscillating movement of the spring load and to also provide for directing the flow of spring liquid radially outward toward the cylinder walls to improve the heat transfer characteristics of the mechanism. The liquid valving structure includes a generally cylindrical member slidably mounted on the piston rod and including a portion movable into a cavity formed in the cylinder head at the rod end of the cylinder to form an improved piston retardation chamber or dashpot.

In accordance with still a further aspect of the present invention there is provided an improved linearly extensible cylinder and piston type hydraulic spring mechanism and the like having a piston rod seal particularly adapted to withstand very high rate of increase and high intensity pressure loading while permitting rapid oscillatory movement of the piston rod with respect to the seal. The configuration of the seal and the structure for supporting the seal in the cylinder head minimizes the chance of seal leakage and reduces the mechanical loading and fluid flow impingement on the seal proper.

The present invention further provides an improved vehicle suspension system wherein the spring structure comprises a wheel assembly support, an improved wheel support suspension spring and a suspension vibration dampener in a single structural assembly which is durable, is easily interchanged, if necessary, for replacement or repair and may be selectively controlled to change the nominal ride height of the vehicle frame with respect to the undercarriage.

Although the present invention is directed primarily to an improved hydraulic suspension spring and vibration dampener mechanism for use in connection with off-highway trucks and similar types of vehicles it will be appreciated by those skilled in the art that the present invention may be used in conjunction with on highway vehicles as well as in other applications requiring the absorption and dampening of relatively high frequency and high amplitude cyclical forces. The above-described features and advantages of the present invention together with further superior aspects thereof will be appreciated by those skilled in the art by reading the detailed description which follows in conjunction with the drawing.

BRIEF DESCRIPTION OF THE DRAWING

FIG. 8 is a detail section view of another embodiment of an improved piston rod seal for the suspension spring mechanism of the present invention;

FIG. 8A is a detail section view on a larger scale of a portion of the piston rod seal shown in FIG. 8;

FIG. 9 is a detail view of a vehicle suspension mechanism including another alternate embodiment of a suspension spring mechanism in accordance with the present invention;

FIG. 10 is a longitudinal central section view of still another alternate embodiment of a suspension spring mechanism;

DESCRIPTION OF THE PREFERRED EMBODIMENTS

Figure 1:
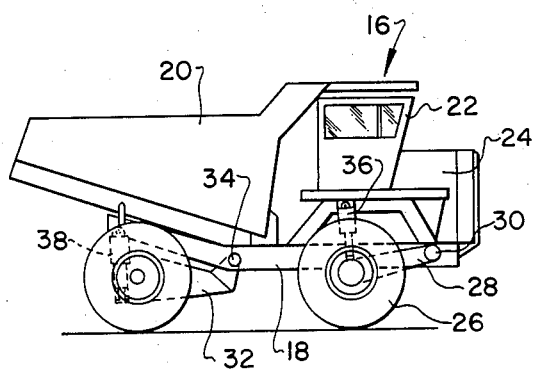
FIG. 1 is a side elevation of an off-highway dumper truck having a suspension system including an improved suspension spring and dampener mechanism of the present invention.

In the description which follows like parts are marked throughout the specification and drawing figures with the same reference numerals, respectively. The drawings are not necessarily to scale and certain features of the invention may be shown in schematic form in the interest of clarity and conciseness.

In the description which follows and as illustrated in the drawing the improved vibration isolator and dampener apparatus of the present invention is particularly configured for use as a suspension spring for a vehicle and also known as a suspension strut. One of the most severe duty applications for vibration isolators or springs for land vehicles is in a vehicle such as an off highway material hauler of the type illustrated in FIG. 1 and generally designated by the numeral 16. The vehicle 16 is characterized as a so-called dumper truck of a size which is capable of hauling from 50 to 200 tons of material such as various types of mineral ore or earth overburden which must be moved from point-to-point over very rough terrain. These vehicles represent very large capital investments and their operation must not be compromised by substantial down time or reduced operating speed as a result of poorly designed suspensions. Suspension systems for vehicles of this type which do not permit operation at optimum speed also contribute to driver fatigue as well as to early failure of vehicle frame components, suspension components and tires. Accordingly, it is of importance to provide such a vehicle with a suspension system which is capable of isolating the displacement of the vehicle undercarriage with respect to the load supporting frame and to dissipate the energy generated by displacement of the vehicle suspension system without rapidly degrading the suspension isolator and dampener itself. In this regard a substantially improved vibration isolator or spring is provided in the form of a cylinder and piston type suspension strut in accordance with the present invention.

Figure 2:
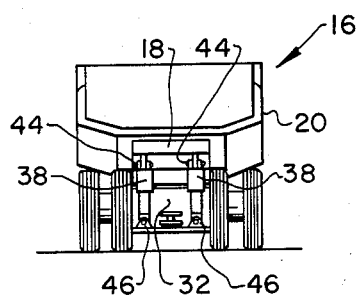
FIG. 2 is a rear end view of the truck illustrated in FIG. 1.

Referring to FIGS. 1 and 2, the dumper truck 16 comprises a main frame 18 for supporting a material containing body or bed 20, a driver cab 22 and an engine housing 24. The frame 18 is supported by independently suspended front steering wheels 26, one shown, mounted on trailing arm suspension members 28, one shown, pivotally connected to the frame 18 at 30.

As shown in FIG. 2 also, the truck 16 typically includes a rear dual wheel and axle assembly 32 which is pivotally connected to the frame at 34, FIG. 1, by a suitable bearing which will permit limited pivotal movement about a horizontal transverse axis and a horizontal longitudinal axis. In accordance with the present invention the suspension system for the truck 16 includes improved cylinder and piston type vibration isolating and dampening suspension springs or struts, generally designated by the numerals 36 and 38, respectively. The struts 36 and 38 are of substantially identical configuration but may be sized according to the weight to be supported at the respective ends of the frame 18. The suspension struts 36, one shown in FIG. 1, are interconnected between the frame 18 and the suspension arms 28 at their opposite ends respectively. The suspension struts 38 are also similarly suitably connected at their opposite ends to the vehicle frame 18 and to the wheel and axle assembly 32 at pivot connections 44 and 46, FIGS. 2 and 3, respectively. The suspension struts 36 and 38 advantageously combine the function of a vibration isolator or spring with a displacement or vibration dampening means for permitting displacement of the wheel and axle assemblies 26 and 32 without transmitting displacement or severe stresses to the frame 18. The suspension struts 36 and 38 also provide for operation in an improved damping factor range which reduces loading on the vehicle wheel and axle assemblies and other components making up the suspension system of the truck 16.

Figure 3A:
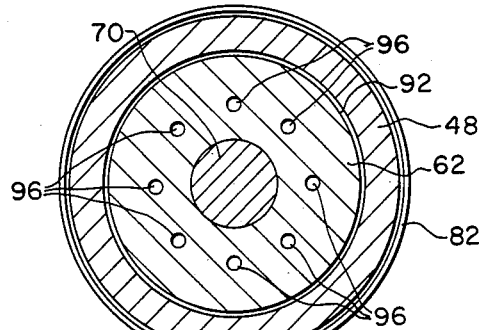
FIG. 3A is a section view taken along line 3A—3A of FIG. 3.
Figure 3B:
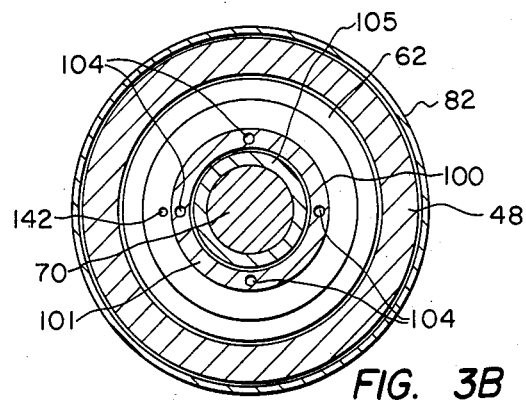
FIG. 3B is a section view taken alog line 3B—3B of FIG. 3.
Figure 3:
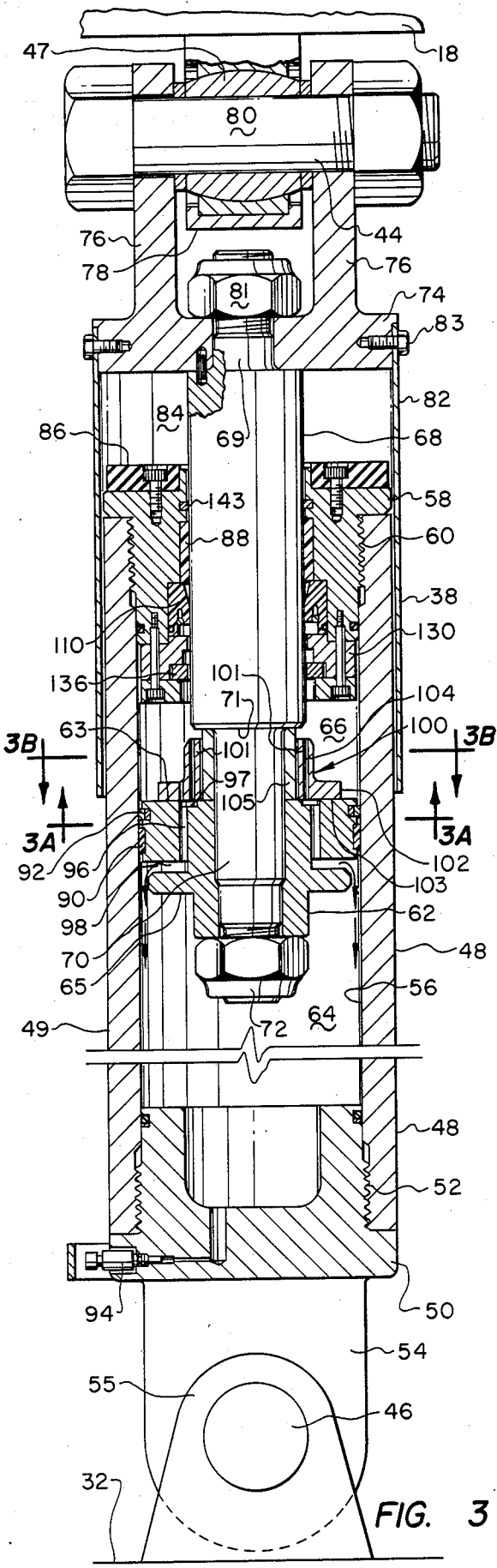
FIG. 3 is a longitudinal central section view of one of the suspension spring and dampener mechanisms of the type used on the truck illustrated in FIGS. 1 and 2.
Figure 4:
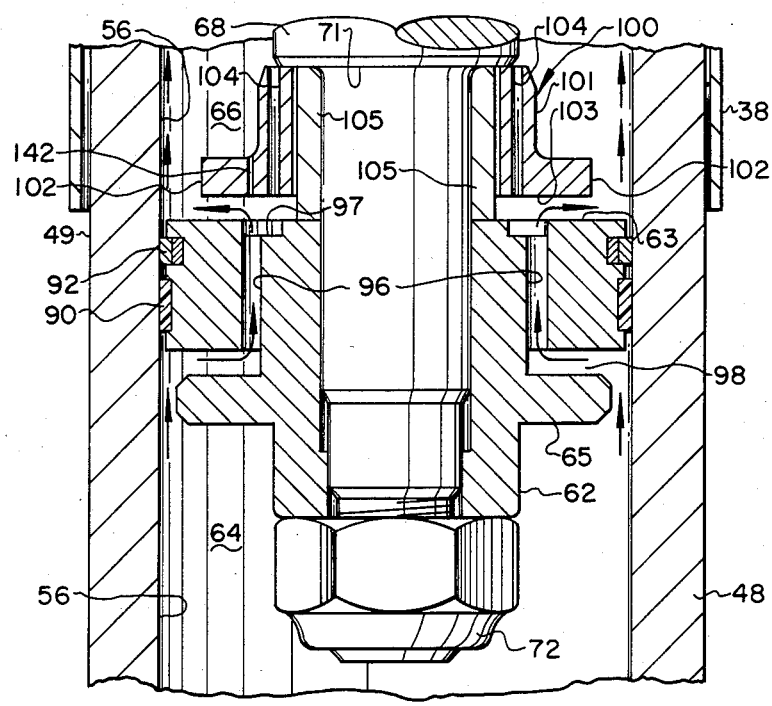
FIG. 4 is a detail section view showing the suspension spring piston and flow control valve in their relative positions when the mechanism is being telescoped or contracted to accommodate upward displacement of the suspension which it supports.
Figure 5:
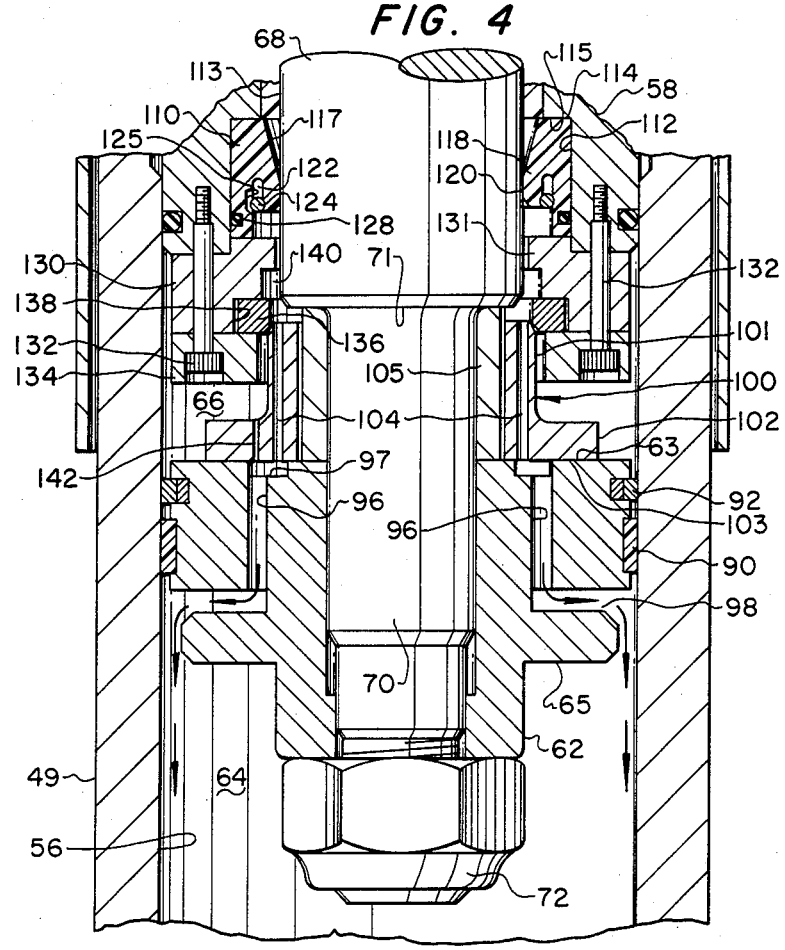
FIG. 5 is a detail section view similar to FIG. 4 and showing the relationship of the piston and flow control valve structure when the piston rod is being extended with respect to the spring cylinder.

Referring now to FIGS. 3 through 5, in particular, a preferred embodiment of a vibration isolating and dampening suspension strut is illustrated in detail. For the sake of description herein the suspension strut illustrated in FIGS. 3 through 5 will be assumed to be one of the suspension struts 38. However, the suspension struts 36 may be of substantially similar design but sized to accommodate the supporting and dampening requirements of the front wheel suspension of the truck 16.

The suspension strut 38 preferably comprises an elongated cylindrical tubular cylinder member 48 having a first head portion 50 which may be formed separate from the cylinder 48 and threadedly engaged therewith by cooperating threads 52. The head portion 50 is suitably formed to include a tongue portion 54 interposed between spaced apart clevis portions 55, one shown, forming the pivot connection 46 and including a spherical bearing assembly 47, as shown by way of example for the pivot connection 44 in FIG. 3. The cylinder 48 is characterized by a cylindrical bore defined by a bore wall 56 and is closed at the end opposite the head 50 by a second head member 58 of similar configuration and threadedly engaged with the cylinder 48 by cooperating threads 60. The suspension strut 38 includes a cylindrical piston 62 slidably disposed in the cylinder bore and dividing the bore into opposed fluid chambers 64 and 66. The piston 62 is retained on an elongated piston rod 68 having a reduced diameter portion 70 on which the piston 62 is disposed and retained thereon by a nut 72. The piston rod 68 extends into the cylinder 48 and is extensible and retractable with respect to the cylinder.

The piston rod 68 includes a separable head portion 74 having spaced apart clevis members 76 between which a tongue part 78 extends and forms part of the vehicle frame 18. A suitable pivot pin 80 and the bearing assembly 47 form the pivot connection 44 between the strut 38 and the frame 18. The piston rod 68 is secured to the head portion 74 by an axially extending reduced diameter rod portion 69 which is threadedly engaged with a nut 81. The head portion 74 is suitably secured in assembly with an axially extending tubular sleeve member 82 by fasteners 83. The sleeve 82 is dimensioned to extend in telescoping relationship around the outer circumference of the cylinder 48 to form a shield for the portion of the piston rod 68 extending from the cylinder head 58 and to provide means for pumping ambient air into and out of a chamber 84 formed between the sleeve 82, the piston rod 68 and the cylinder 48. A resilient cushion member 86 is suitably secured to a transverse upwardly facing wall of the head member 58.

The piston and piston rod assembly 62–68 is supported for reciprocal sliding movement in the cylinder 48 on an enlongated sleeve bearing 88 disposed in a suitable recess in the head 58 and a sleeve bearing 90 disposed around the periphery of the piston 62. The sleeve bearings 88 and 90 may be made of a suitable self-lubricating material such as a typical bearing metal or a filled fluorocarbon plastic. The piston 62 is also provided with a cylindrical piston ring type seal 92 disposed around its periphery and slidably engaged with the bore wall 56 to provide a substantially fluidtight seal between the chambers 64 and 66. The suspension strut 38 functions as a spring and a vibration or oscillation dampening device in combination and is preferably operable to be filled with liquid silicone such as a Series 200 silicone fluid having a viscosity of 1000 centistokes at 67° F. and commercially available from Dow-Corning Corporation, Midland, Mich. The liquid introduced into chamber 64 and allowed to flow into chamber 66 by means to be described herein may be provided through a suitable valve 94 in the head 50.

The chamber 64 and 66 are in fluid flow communication with each other by way of passage means formed in the piston 62 and comprising a plurality of elongated passages 96 opening to a transverse piston end face 63 facing the chamber 66 and to a radially extending annular flow channel 98 opening into the chamber 64 and formed by an integral piston baffle part 65. The passages 96 are preferably in sufficient number as to provide for a suitably restricted flow of liquid from the chamber 64 to the chamber 66 when the piston 62 and rod 68 are being retracted into the cylinder 48 under a load imposed on the suspension strut. The weight of the vehicle frame and other components supported by the struts 38 results in compression of liquid in the chambers 64 and 66. Further loading on the strut tending to retract or telescope the piston rod 68 into the cylinder 48 causes additional compression of the liquid and transfer of the liquid from the chamber 64 to the chamber 66.

In accordance with an important aspect of the present invention the suspension strut 38 includes means for controlling the flow of fluid from the chamber 66 to the chamber 64 to increase the resistance of flow of fluid in that direction versus the resistance to flow from the chamber 64 to the chamber 66. The suspension strut 38 includes a valve member comprising a generally cylindrical sleeve 100 extending in sleeved relationship around the piston 62 and between the piston end face 63 and a transverse shoulder 71 formed on the piston rod 68 between the main portion of the rod and the reduced diameter portion 70. The valve member 100 includes a cylindrical hub portion 101 and a radially extending circular flange portion 102 which is adapted to be engaged with the transverse face 63 along a cooperating surface 103. The valve member 100 is freely axially movable on a cylindrical spacer 105 disposed over the rod portion 70 between the piston 62 and the shoulder 71. The valve member 100 includes a plurality of circumferentially spaced apart elongated passages 104 which extend axially through the hub portion 101. The passages 104 are adapted to be in communication with an annular channel 97 formed in the piston face 63 and in communication with the passages 96. The passages 104 are preferably four in number, FIG. 3B, or otherwise provide an effective cross-sectional flow area less than the cumulative cross-sectional flow area of the passages 96 so as to increase the resistance of flow of fluid from the chamber 66 to the chamber 64 which must be by way of the passages 104, the flow channel 97 and the passages 96.

Referring particularly to FIG. 5, the suspension strut 38 also includes an improved high pressure seal assembly including a generally annular seal member 100 disposed in a cavity 112 formed in the head 58 in surrounding relationship to the circumferential polished outer surface 113 of the piston rod 68. The seal member 110, which is preferably formed of a fluorocarbon plastic, includes a transverse end face 114 disposed in abutting engagement with a cooperating end wall 115 of the cavity 112. The seal member 110 includes a circumferential cantilever beam lip portion 118 having an inner circumferential surface 120 operable to be in sliding engagement with the surface 113 of the piston rod. The beam portion 118 forms a cavity 122 with the remainder of the body of the seal member 110 and is engageable with a circumferential elastomeric o-ring member 124 disposed around and engageable with the beam portion 118 and operable to deflect the beam portion into forcible engagement with the piston rod 68. A suitable groove 125 is formed in the seal member 110 or may also be formed in the o-ring 124 to allow fluid to enter the cavity 122 from chamber 66 except when the piston 62 is in the position shown in FIG. 5. Accordingly, under normal operating conditions, when the piston rod 68 is not fully extended, pressure fluid may act on the beam portion 118 of the seal member 110 to bias the seal surface 120 into forcible engagement with surface 113.

Referring further to FIG. 5, the seal member 110 is of a unique configuration wherein a radially outwardly relieved conical surface 117 is formed on the seal member between the end face 114 and the piston rod circumferential surface 113. This radially relieved conical surface or ramp 117 prevents no more than the desired amount of surface area defined by the surface 120 from forcibly engaging the piston rod surface 113. Fluid pressure acting on the transverse axially projected area of the seal member 110 facing the chamber 66 will tend to rotate the seal so that the surface 117 comes into engagement with the surface 113. This is alleviated by the radically outwardly relieved conical configuration of surface 117. When the rod 68 is being extended to increase the pressure in the chamber 66 this pressure is also present in the cavity 140 and tends to squeeze the beam portion 118 radially inward into engagement with the rod surface 111 to effect a fluid-tight seal. The resilient o-ring 124 functions only as a stressing ring to maintain a radially inwardly directed squeeze on the beam member 118 sufficient to provide low pressure sealing between the surfaces 120 and 113. A second o-ring member 128 is suitably retained in a circumferential groove in the seal member 110 and the seal member 110 is retained in the cavity 112 by a retaining ring 130 secured to the head member 58 by socket head screws 132.

The screws 132 also retain a second retaining ring 134 which operates to secure a cylindrical seal ring 136 in a counterbore 138 formed in the ring 130. The seal ring 136 is preferably formed of an elastic material such as nylon and is operable to engage the outer circumferential surface of the hub portion 101 to form a cavity 140 between the hub portion and the seal 110 which is effectively sealed from the chamber 66 when the valve member 100 enters into engagement with the seal ring 136. The counterbore 138 is of slightly larger diameter than the outer diameter of the seal ring 136 to permit radial expansion of the seal ring upon engagement with the hub portion 101. The seal ring 136 and the hub portion 101 are preferably formed with cooperating beveled surfaces to facilitate engagement. A relief passage 142 is formed in the flange 102 of the valve member 100 and is operable to communicate the chamber 66 with the flow passages 97 and 96 to serve as the sole passage means between the chambers 66 and 64 when the valve member 100 is engaged with the seal ring 136 as shown in FIG. 5.

The axially slidable valve member 100 together with the construction of the piston 62 and the passages 96, 97 and 98 provide for a substantially improved hydraulic suspension strut for off-highway as well as over-the-highway vehicles and for other applications as will be appreciated by those skilled in the art. By using a fluid such as the silicone liquid referenced herein in the chambers 64 and 66 the suspension strut 38 may be precharged with fluid to position the supported load in such a way that the strut is normally under light or empty weight load operating with its piston 62 and piston rod 68 in the nominal position illustrated in FIG. 3. Under this operating condition the silicone liquid has undergone approximately 6% compression of its total compressibility of 18%. When the vehicle 16, for example, is fully loaded the strut 38 will be forced to retract its piston 62 and rod 68 further into the chamber 64 further compressing the silicone liquid to decrease its volume by an additional 6%. This leaves effectively 12% and 6% compression, respectively, for reciprocation of the piston 62 and rod 68 when the vehicle is unloaded and fully loaded, respectively.

One of the major problems associated with the use of a hydraulic suspension spring strut and, in particular, with the use of liquid silicone is the thermal volumetric expansion and contraction of the liquid. Under relatively severe duty cycle applications of the suspension strut 38 the transfer of fluid between the chambers 64 and 66 through the restricted flow passages in the piston 62 and the valve member 100 will result in substantial heating of the fluid. Additionally, the rubbing action of the bearing sleeves 88 and 90, the seal member 110, the seal 92 and the wiper ring 143, FIG. 3, will also generate heat which eventually is transferred to the substantial quantity of fluid in the chamber 64 during operation of the strut. Heating of the silicone liquid will change its viscosity as well as result in expansion of the liquid which will change the ride height of the vehicle, possibly resulting in full extension of the piston rod 68 into the position wherein the valve flange 102 is engaged with the retaining ring 134. Accordingly, it is important to maintain the main body of fluid in the chamber 64 at or near the ambient temperature or at least prevent substantial heating of the fluid which could result in degradation of the various seal members for the strut 38 and seriously affect the ride height of the supported vehicle with respect to its undercarriage.

Referring particularly to FIGS. 3 and 4, the relationship of the piston 62 with respect to the valve member 100 is illustrated in the respective conditions when the piston and piston rod assembly is being extended from the cylinder 48 and retracted into the cylinder under cyclic loading of the suspension strut 38. In FIG. 4 the piston 62 and the valve member 100 are shown in their positions relative to each other when the piston and piston rod 68 are under a load tending to telescope or retract the piston rod into the cylinder bore. Under these circumstances the fluid in chambers 64 and 66 is being compressed and fluid is flowing from the chamber 64 to the chamber 66 through the annular flow channel 98, the passages 96 and the annular groove 97. Since the chamber 64 is contracting while the chamber 66 is tending to expand fluid flowing between these chambers will force the valve member 100 against the shoulder 71 to define an annular flow channel between the faces 63 and 103 wherein fluid entering the chamber 66 will flow radially outward toward the bore wall 56. Accordingly, during retraction of the piston and piston rod into the cylinder 48 the flow of liquid from the chamber 64 to the chamber 66 is restricted primarily by the flow channel 98, the passages 96 and the flow channel formed between the faces 63 and 103 and, upon leaving the annular channel between these faces, the fluid impinges the cylinder bore wall 56 and tends to flow along the wall as indicated by the directional arrows in FIG. 4. Thanks to the direction of flow of the fluid imposed by the formation of the flow channel between the surfaces 63 and 103, the fluid is brought into heat exchange relationship with the cylinder 48 and heat is transferred to the cylinder outer surface 49.

Referring to FIG. 3, when the strut 38 is undergoing a rebound or extension of the piston 62 and piston rod 68 with respect to the cylinder 48 fluid in the chamber 66 flows to the chamber 64 and the pressure differential created thereby will move the valve member 100 into the position illustrated with the surfaces 63 and 103 in abutting and substantially fluid sealing engagement. Accordingly, fluid transferring from the chamber 66 to the chamber 64 must flow through the passage 104, the channel 97, the passages 66 and is then directed radially outwardly towards the bore wall 56 as it flows through the channel 98. Thanks also to the valve member 100, the resistance to flow of fluid from the chamber 66 to the chamber 54 is greater than in the opposite direction and the cyclic extension and retraction of the piston with respect to the cylinder 48 is dampened during the extension or rebound portion of the spring oscillation cycle. The substantial heating of the silicone fluid as it is forced through the passages 104, 97 and 96 is dissipated by contact of the fluid along the bore wall 56 as it passes through the annular flow channel 98 and is turned to flow along the borewall 56 into the chamber 64. Accordingly, fluid flowing into the chamber 64 does not floor directly into the main body of fluid in the center of the chamber but first contacts the borewall 56 of the cylinder 48 to transfer a substantial portion of its heat to the cylinder which dissipates heat to the atmosphere surrounding the suspension strut 38. The cooling action on the fluid within the chambers 64 and 66 is further enhanced by a pumping action of the piston rod head 74 and the sleeve 82 as the piston rod moves with respect to the cylinder 48 and air is pumped into and out of the chamber 84. The flow of air into and out of the chamber 84 is along the outer wall 49 to enhance heat transfer away from the cylinder 48 and the fluid contained within the chambers 64 and 66.

In the event that the piston and piston rod assembly are extended with respect to the cylinder 48 sufficiently such that the valve member hub 101 engages the seal ring 136, as indicated in FIG. 5, fluid may escape from the chamber 66 only through the passage 142. Accordingly, once the valve member 100 has moved into sealing engagement with the ring 136 further movement of the piston 62 to extend the rod 68 from the cylinder is substantially retarded by entrapment of fluid in the cavity 66. Moreover, when the valve member 100 moves into sealing engagement with the ring 136 fluid pressure acting on the seal 110 is maintained at a level no more than is present in the chamber 64 and the seal 110 is not exposed to the substantial increase in pressure experienced in the chamber 66. The seal member 110 is also substantially protected from convective fluid flow in the cavity 140 by a radially inward extending baffle portion 131 of the retaining ring 130.

The above-described unique structure provided by the hydraulic suspension strut 38 has enabled the provision of a strut having a damping factor or ratio of approximately 0.4 to 0.6 without the detrimental effects of thermal degradation of the strut or erratic changes in ride height of the strut. The redirection of the flow of fluid between the chambers 64 and 66 to provide heat transfer away from the main body of the fluid in the respective chambers and the unique flow restricting valve 100 provides a superior combination vibration isolator or spring and spring dampener producing the benefits described above for use in conjunction with land, off-highway vehicles, in particular.

The suspension strut 38 as well as the other embodiments disclosed herein is particularly adapted for use as a vehicle suspension component but the salient features of the invention also provide for use of the suspension strut in other vibration isolation and damping applications. Moreover, as indicated above, the improved suspension strut 38 also provides for adapting the strut to operate with a damping ratio in the range of approximately 0.4 to 0.6 whereas prior art suspension struts including combination hydraulic-pneumatic types can operate only in a damping ratio range of about 0.2 to 0.25 maximum. The damping ratio is the ratio of the damping constant of the particular system in question to the damping constant of a critically damped system, that is, one in which the maximum ratio of diminishing amplitude of vibration occurs. The damping ratio and the damping constant are discussed by Ralph Burton in Vibration and Impact, Dover Publications, Inc., New York, 1968.

Figure 7:
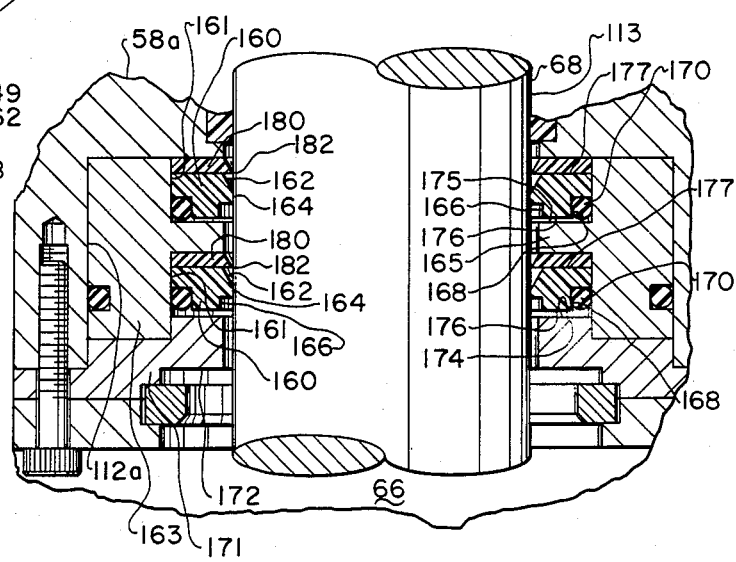
FIG. 7 is a detail section view of an improved piston rod seal arrangement for the suspension spring mechanism of the present invention.

Referring now to FIG. 7, another embodiment of a piston rod seal arrangement in accordance with the present invention is illustrated in detail and includes a tandem arrangement of two generally cylindrical seal body members 160 adapted to be disposed in respective counterbores 161 formed in a seal insert 163 which is suitably supported in a bore 112a formed in a modified head member 58a. The seal body members 160 each include a radially outwardly relieved conical surface 162, a generally cylindrical inner sealing surface 164, an inner annular counterbore 166 and an outer circumferential annular recess 168. A resilient o-ring type stress ring 170 is disposed in the recess 168 and is operable to bias the seal body 160 radially inwardly in sealing engagement with the surface 113 of the piston rod 68. The seal assembly illustrated in FIG. 7 is retained in the bore 112a by a modified retaining ring 171 having an axially projecting hub portion 172 which is dimensioned to provide a small axial space between opposed surfaces 174 and 176. A shoulder 165 provides a similar space between surfaces 175 and 176 of the second seal assembly. Each seal body 160 is also backed by a substantially rigid ring 180 having an inner lip 182 forming a sealing line with the surface 113.

When the piston rod 68 is being retracted into the cylinder the reduced pressure in the cavity 66 will result in the primary sealing effort of the surfaces 164 being carried out by a radially inward squeezing on the seal body 160 due to the elastic memory of the o-rings 170. Fluid pressure in the cavity 66 also acts on the seal body inner and outer circumferential surfaces defining counterbore 166 as well as the recess 168 and on the o-ring 170 to form opposing forces which are balanced in accordance with the extent of the opposing surface areas so that a controlled amount of sealing force is exerted on the seal body 160 to squeeze it radially inwardly. Moreover, the generous transverse surface area of the seal body face 177 and the conical relief surface 162 together with the substantially rigid ring 180 also minimizes the tendency for the body 160 to tilt or extrude out of the seal cavity.

Referring now to FIGS. 8 and 8A, an alternate embodiment of a piston rod seal for the suspension strut 38 is illustrated. In the seal arrangement illustrated in FIGS. 8 and 8A a generally cylindrical seal body 200 is provided with an inner cylindrical sealing surface 202 and a radially outwardly relieved conical ramp surface 204. A circumferential counterbore 206 and opposed outer recesses 208 and 210 are also formed in the body, wherein the latter recess is adapted to receive a resilient o-ring member 212. The axial depth of the recess 210 with respect to the longitudinal axis of piston rod 68 is less than the relaxed diameter of o-ring 212. A cylindrical rigid back up ring 214 similar to the back up ring 180 is also disposed in the recess 112 between the seal body 200 and the transverse end wall 115. A modified retaining ring 130a is utilized in the seal arrangement illustrated in FIG. 8 and includes a radially inward projecting baffle 131a. Inner and outer circumferential surfaces 207 and 209 are proportioned to provide opposing radially directed forces acting on the seal body to assist in controlling the force acting on the rod 68 by the sealing surface 202. At the same time the axially projected face area of the body 200 exposed to high pressure fluid will effect movement of the body toward the back up ring 214 whereby the squeeze on the o-ring 212 is effective to cause radial inward squeezing action on the body 200 controlled in accordance with the dimensions of the recess 210 in relation to the volume of the o-ring 212.

Accordingly, as shown in FIG. 8A, pressure fluid acting on the axially projected annular area $A_s$ of the seal body 200 between the surface 202 and the outer peripheral edge of the body will deflect the o-ring 212, as indicated by the dotted lines in FIG. 8A, as the seal body moves toward engagement with the ring 214 also indicated by dotted lines. This deflection of the o-ring 212 will increase a radially inward force acting on the seal body 200 to increase the sealing effect of surface 202 on surface 113 as pressure in the cylinder chamber 66 increases. The effective area $A_s$ may be diminished somewhat by fluid leaking past the seal body outer surface into the recess 210 but this area will still be sufficient to cause a force acting on the seal body 200 to move it toward the alternate position.

Figure 6:
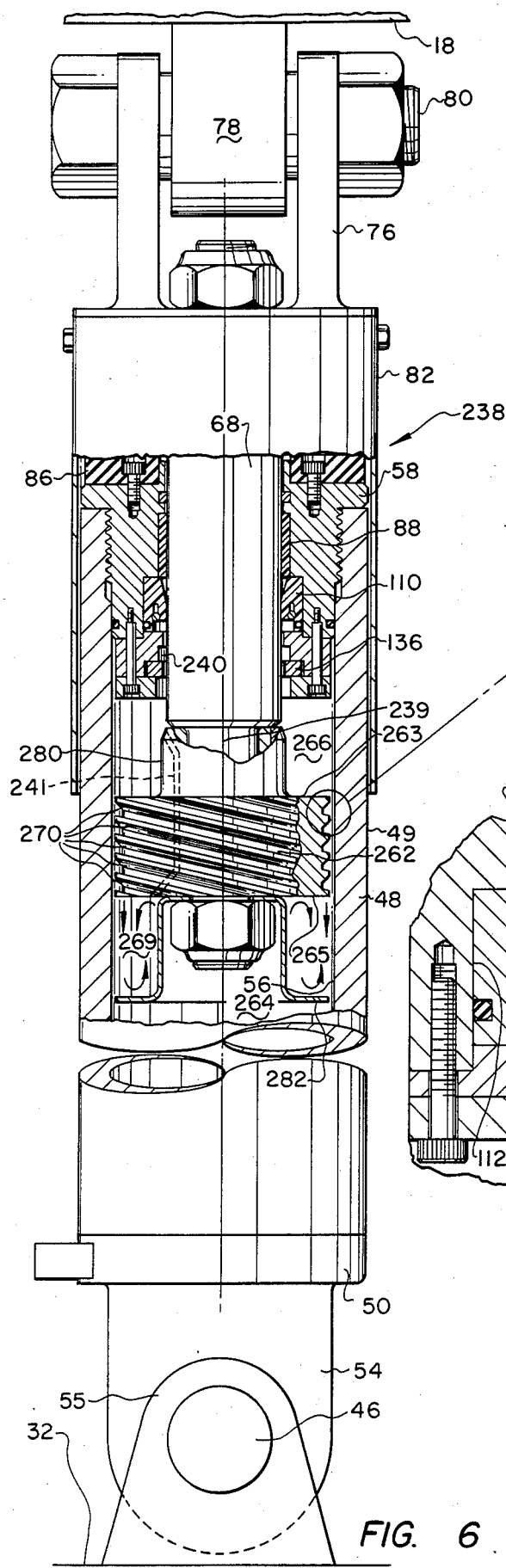
FIG. 6 is a longitudinal central section view of an alternate embodiment of a suspension strut in accordance with the present invention.
Figure 6A:
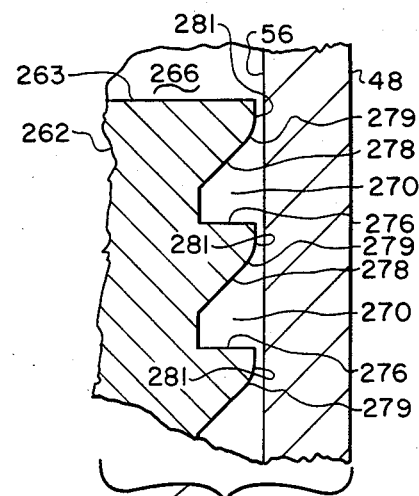
FIG. 6A is a detail section view of a portion of the piston of the embodiment shown in FIG. 6.

Referring now to FIGS. 6 and 6A, an alternate embodiment of a suspension strut in accordance with the present invention is illustrated in detail and generally designated by the numeral 238. The suspension strut 238 includes a cylinder 48, and a piston rod 68 extending there into and dividing the interior of the cylinder bore into chambers 264 and 266 by means of a piston 262. The piston 262 is secured to the rod portion 70 by nut 72 in the same manner as the piston 62. The piston 262 includes passage means for communicating the cylinder chambers 264 and 266 comprising a plurality of spiral grooves 270 formed on the outer circumference of the piston 268 and extending between opposed end faces 272 and 274. The grooves 270 may, for example, be characterized as double or triple thread grooves so that adjacent grooves shown are each in parallel communication with the chambers 264 and 266. The grooves 270 thus communicate working fluid between the chambers 264 and 266 when the piston 262 and piston rod 68 are being extended from or telescoped into the cylinder 48. The cross-sectional profile of the grooves 270 in a plane parallel to the longitudinal axis 239 of the suspension strut 238 is illustrated in FIG. 6A wherein each of the grooves 270 has a first flank 276 extending in a plane substantially normal to the axis 239 and a second flank 278 extending at an acute angle with respect to the axis and including a curved portion 279 forming a somewhat venturi shaped orifice between the flank and borewall 56. Accordingly, when the piston 262 is moving in the direction to transfer fluid from the chamber 264 to the chamber 266 fluid will flow through the grooves 270 between piston end faces 263 and 265. Fluid will also tend to flow from one groove 270 to another in meeting somewhat less resistance thanks to the sloping flanks 278–279 which form a plurality of venturilike flow passages between the bore wall 56 and the peripheral surface of the piston 262.

On the other hand when the piston 262 is moving toward the cylinder head 58 to transfer fluid from the chamber 266 to the chamber 264 a substantially sharp edged orifice is presented between adjacent grooves 270 due to the transverse flanks 276. This configuration forms a somewhat labyrinth type seal between the periphery of the piston 262 and the bore wall 56 and presents a greater resistance to fluid flow when the piston rod 68 is extending from the cylinder 48 and increasing the volume of the chamber 264 to perform the strut damping function. Moreover, fluid transferring between the chambers 266 and 264 through the spiral grooves 270 and between the grooves 270 is constantly flowing in intimate contact with borewall 56 to transfer heat generated in and by the fluid to the cylinder 48 for transfer to the surface 49 and to the environment in which the suspension strut 238 is operating.

The piston 262 includes an integral axially extending hub portion 280 in place of the sliding valve member 100 and which is adapted to extend into a cavity 240 in sliding engagement with the seal ring 136 to form a dashpot or cushion to prevent violent engagement of the piston 262 with the head 58. A passage 241 extends from the end face of the hub portion 280 to the face 265 of the piston 262 to limit fluid pressure buildup in the cavity 240 when heh hub portion 280 moves into sealing engagement with the seal ring 136. The piston 262 is also provided with a flow separating shield 282 secured to the piston rod by the nut 72 to form a subchamber 269 and to prevent substantial mixing of fluid entering the chamber 264 with the main body of fluid already present in that chamber during transfer of fluid from the chamber 266. The piston 262 is not provided with a bearing ring; however, circumferential flank surfaces formed by axially extending surface portion 281 of the flank portions 279 may be coated with an anti friction coating and the clearances between the piston 262 and the borewall 56 may be such as to form some bearing support if lateral loading on the rod 68 is extreme.

As previously mentioned the suspension strut of the present invention may also be adapted for use in connection with over-the-road automotive vehicles. Referring to FIG. 9, for example, there is illustrated a portion of a rear wheel independent suspension system for an automative vehicle including a chassis or frame 300 and a control arm 302 pivotally connected to the frame and to a wheel spindle 304. Another embodiment of the suspension spring mechanism or strut of the present invention is shown connected to the spindle support 305 and is generally designated by the numeral 306. The suspension strut 306 includes a cylinder 307 which is modified to be suitably connected to the spindle support 305 and is pivotally connected at its upper end at 309 to the frame 300. The strut 306 is substantially identical to the strut 38 except for modification of the cylinder distal end to accommodate the particular type of vehicle structure to which it is connected. The suspension strut 306 conveniently replaces the combination coil spring and so called shock absorber structure for both steering and non steering wheel suspensions conventionally known as a MacPherson type suspension unit.

Referring now to FIG. 10, there is illustrated another embodiment of a suspension spring mechanism or strut in accordance with the present invention and generally designated by the numeral 338. The suspension strut 338 includes a cylinder 348 similar to the cylinder 48 but including an integral extended portion 350 including a bore 351 for receiving a swivel shaft portion of a wheel spindle, not shown. A piston 62 and a piston rod 368 of the suspension strut 338 are slidably disposed in a bore defined by a cylindrical borewall 356 to divide the interior of the cylinder 348 into opposed chambers 364 and 366. The piston 62 is secured to a rod portion 370 by a nut 72. The chamber 364 is closed at its lower end by a head member 369 and the upper end of the cylinder 348 is closed by a head member 358 having a resilient cushion member 372 secured thereto. The piston rod 368 is secured to a rod head portion 374 which in turn is secured to a cylindrical heavy walled support housing 376 having an elongated cylindrical bore 380 for receiving the cylinder 348 in telescoping sleeved relationship thereto.

The housing 376 includes spaced apart sleeve bearings 382 disposed in the bore 380 for slidably supporting the cylinder member 348 with respect to the housing 376. The housing 376 may be adapted to be rigidly secured to suitable support structure, not shown, by a mounting flange 377. Accordingly, the suspension strut 338 may comprise not only a vibration isolating spring and dampening structure for a wheel unit but comprise the sole supporting structure for the wheel unit. The sliding valve member 100 is disposed on a spacer 365 secured between a shoulder 371 and the piston end face 63. The spacer 365 has a transverse shoulder 367 engageable with the valve member 100 to limit its travel away from the piston end face 63. The psiton rod 368 may have a smaller outer diameter since it is not required to support lateral loads. The other internal structure of the suspension strut 338 is substantially identical to the strut 38 and is not believed to require further detailed description to enable one to practice the invention embodied therein. Thanks to the substantial volume of liquid silicone which may be introduced into the cylinder chambers the strut 338 as well as the struts 38 and 238 provide improved combination spring or vibration isolation structures and vibration damping means in a single hydraulic cylinder and piston type structure.

The suspension strut 338 may be filled with fluid through a suitable fill valve 382 in communication with a passage, not shown, extending through the piston rod 68 and opening into the chamber 364.

Figures 11, 11A:
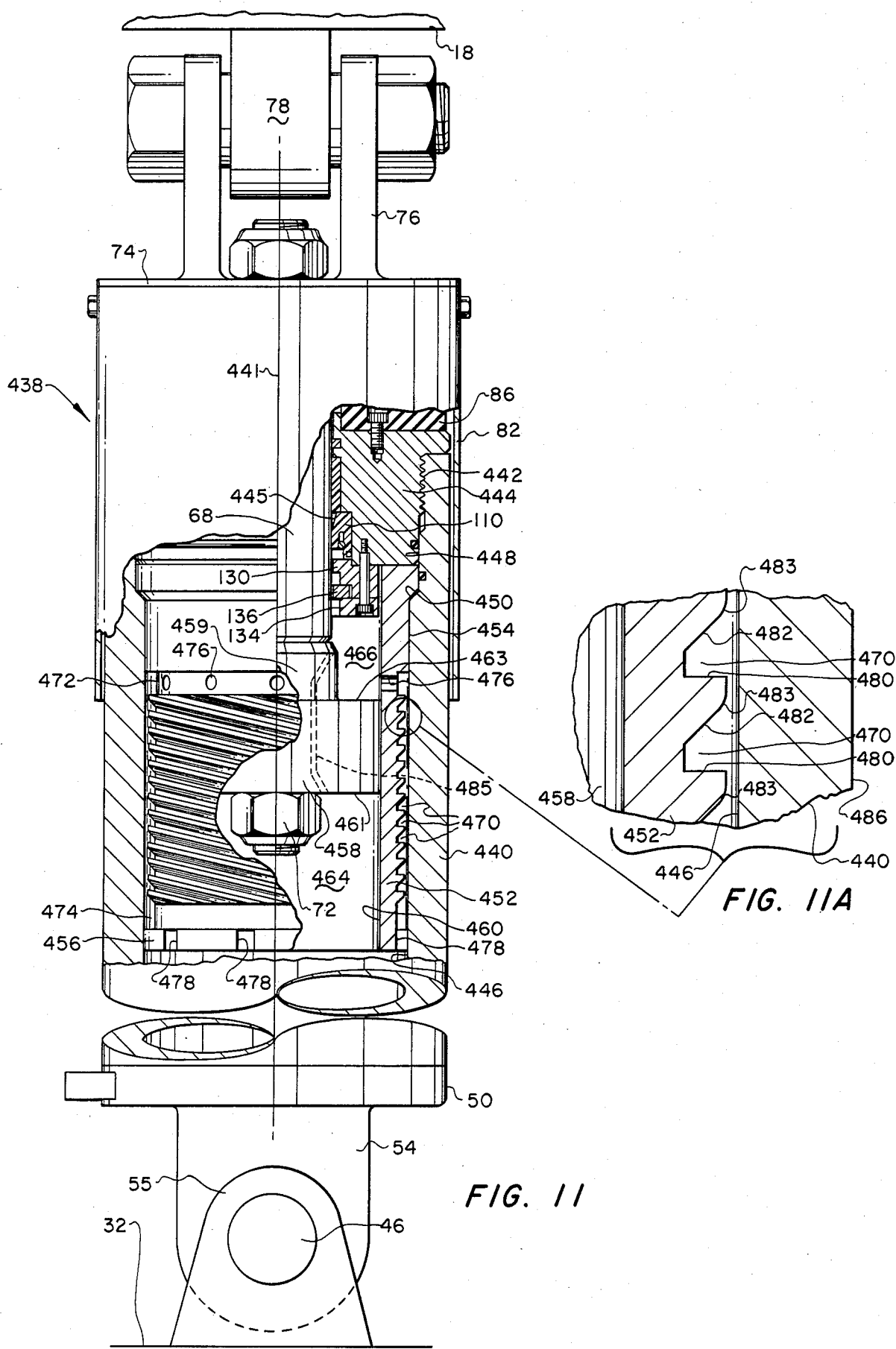
FIG. 11 is a longitudinal view, partially sectioned and broken, showing a third alternate embodiment of the suspension spring mechanism of the present invention.
FIG. 11A is a detail section view on a larger scale of a portion of the cylinder sleeve and cylinder of the embodiment of FIG. 11.

Referring now to FIGS. 11 and 11A, another embodiment of a suspension strut in accordance with the present invention is illustrated and generally designated by the numeral 438. The suspension strut 438 is characterized by an elongated cylinder member 440 having an internally threaded portion 442 at one end for receiving in threaded engagement a head member 444. The cylinder 440 is characterized by a longitudinal cylindrical bore defined by a cylindrical borewall 446 having an intermediate stepped portion 448 between the borewall 446 and the threaded portion 442. The intersection of the borewalls 446 and 448 forms a shoulder 450. The cylinder 440 is adapted to be secured to a lower head member 50 in the same manner as the suspension strut 38.

An elongated cylindrical sleeve member 452 is disposed in the bore of the cylinder 440 and is secured therein between the head member 444 and the shoulder 450. The sleeve 452 includes spaced apart bearing portions 454 and 456 which are in close fitting engagement with the borewall 446. The suspension strut 438 also includes a piston rod 68 which is secured at its distal end to a modified piston 458 slidably disposed within the sleeve member 452 in close fitting and substantially fluid sealing engagement with the inner borewall 460 of the sleeve. The piston 458 is secured on the rod 68 by a nut 72. The rod 68 is secured to a head portion 74 and supporting the outer tubular sleeve 82 in the same manner as the suspension strut 38.

The piston 458 is slidably disposed in the sleeve 452 and is preferably formed with a suitable low friction coating on the exterior surface to form a suitable bearing surface for engagement with the borewall 460. The piston 458 includes a reduced diameter hub portion 459 which is operable to engage the seal ring 136 in the same manner as the embodiments of the suspension strut described in conjunction with FIGS. 3 and 6 herein. The modified head 444 is also adapted to receive the piston rod seal 110 in a suitable cavity 445.

The piston 458 divides the interior of the cylinder 440 into opposed chambers 464 and 466 operable to be filled with the aforementioned silicone fluid. Fluid is transferred between the chambers 464 and 466 through a plurality of spiral grooves 470 formed on the exterior of the sleeve 446 in substantially the same manner as the grooves 270 are formed on the exterior of the piston 262. The grooves 470 may comprise a single or double or triple thread grooves which open, respectively, to peripheral channels 472 and 474 formed on the sleeve 452. The channel 472 opens in to the chamber 466 through a plurality of spaced apart ports 476 extending radially between the channel 472 and the chamber 466. The channel 474 opens into the chamber 464 through axially extending passages 478 formed in the sleeve member bearing portion 456.

Referring to FIG. 11A, the configuration of the grooves 470 is substantially similar to the grooves formed on the piston 262 of the embodiment illustrated in FIGS. 6 and 6A. The grooves 470 are formed by respective flank portions 480 which extend substantially in a plane transverse to the longitudinal axis 441 of the suspension strut 438. The grooves 470 are also defined by flanks 482 extending at an acute angle with respect to the axis 441 and including curved portions 483 forming somewhat venturi shaped orifices between the groove flanks and the cylinder borewall 446.

Accordingly, fluid flowing from the chamber 464 to the chamber 466, in response to telescoping movement of the piston 458 into the cylinder 440, will occur by the flow of fluid from the chamber 464 through the passages 478 into the annular channel 474 and then through the spiral grooves 470 to the channel 472 and then through the ports 476 into chamber 466. Flow in the direction described above will also occur between adjacent grooves 470 through the venturilike orifices defined between the borewall 446 and the groove flank portions 482-483. The spiral flow of fluid through the grooves 470 and the axial flow through the aforementioned orifices will place the fluid in intimate contact with the borewall 446 for transfer of heat through the cylinder 440 to its exterior surface 486. Transfer of fluid from the chamber 466 to the chamber 464, in response to extension of the piston rod 68 from the cylinder 440, will cause fluid to flow in substantially the reverse direction to that described above and the resistance to axial flow of fluid between adjacent grooves 470 will be increased due to the essentially sharp edged orifices formed between the groove flanks 480 and the borewall 446.

The piston 458 is also provided with a pressure relief passage 485 extending from the distal end of the piston hub portion 459 to the piston end face 461. Accordingly, when the hub portion 459 enters into sealing engagement with the seal ring 136 fluid pressure in the cavity between the seal ring 136 and the seal member 110 will be relieved through the passage 485. Moreover, the axial spacing of the ports 476 with respect to the distal end of the piston hub portion 459 is such that as the hub portion 459 engages the seal ring 136, the edge of the piston 458 formed by the transverse end face 463 commences to close off the ports 476 from communicating with the chamber 466. Accordingly, movement of the piston 458 across the ports 476 creates a throttling action as fluid tries to escape from the chamber 466 which is effective to form a dashpot or cushion to decelerate movement of the piston and the rod 68 on an extension stroke from the cylinder 440. One advantage of the arrangement of the suspension strut 438 is that the piston 458 is operable to support lateral loading imposed on the piston rod 68 and is in bearing engagement with the borewall 460. Lateral bearing loads imposed on the sleeve member 452 are transferred to the cylinder member 440 at the bearing surfaces 454 and 456. The suspension strut 438 also provides means for placing the working fluid in intimate contact with its cylinder member to transfer heat away from the main body of fluid in the chambers 464 and 466.

The struts 38, 238, 338 and 438 are normally placed in operation on a vehicle suspension system by filling the lower cylinder chamber with fluid such as the silicone liquid to extend the piston and piston rod assembly to its limit position with respect to its associated cylinder when the suspension strut is under zero load. Suitable vent means, not shown, may be provided to vent air from the cylinder chambers during the filling operation. The empty weight of the vehicle is then imposed on the piston and the fluid in the cylinder chambers causing some compression of the fluid and transfer of fluid to the upper or smaller volume piston chamber. Accordingly, under nominal load conditions, the piston is positioned a comparatively short distance from the head of the cylinder through which the piston rod extends so that the strut is capable of sustaining relatively large steady state and impact loads to compress the liquid in the lower chamber such as the chambers 64, 264, 364, or 464 so that the compression or compliance of the fluid will function in the manner of a spring with a substantially linear spring rate. The suspension spring mechanisms or struts 38, 238, 306, 338 and 438 and the piston rod seals described herein are fabricated using conventional engineering materials used for hydraulic cylinder and piston type actuators and seal structures except as noted herein.

Although preferred embodiments of the present invention have been described herein those skilled in the art will recognize that various substitutions and modifications may be made to the embodiments disclosed without departing from the scope and spirit of the invention as recited in the appended claims.

What I claim is:

1. A suspension apparatus for a vehicle for permitting displacement of wheel support means relative to a frame of said vehicle and for damping said displacement, said apparatus comprising a hydraulic cylinder and piston assembly, including:

an elongated cylinder member defining a wall enclosed longitudinal bore and opposed head portions;

a piston reciprocably disposed for relative bidirectional movement in said bore and dividing said bore into opposed fluid chambers, and a piston rod connected at one end to said piston and extending through one of said chambers and one of said head portions to form a rod end chamber and a second end chamber;

piston rod seal means supported by said cylinder member and including means in fluid sealing engagement with said piston rod to prevent leakage of fluid from said one chamber to the exterior of said apparatus;

a compressible liquid filling the chambers;

means for interconnecting said apparatus between said frame and said wheel support means whereby said piston and piston rod are forced into the cylinder until the fluid is compressed sufficiently in said cylinder member to support the vehicle at a normal height dependent upon the load while permitting reciprocating displacement of said wheel support means in a normal range centered generally about the normal ride height as the vehicle travels over irregular terrain;

flow restriction means for permitting only restricted flow of fluid from one chamber to the other chamber in response to reciprocation of said piston and piston rod with respect to said cylinder member to provide for damped reciprocating displacement of said wheel support means in the normal range;

said flow restriction means including passage means formed by said piston extending between said chambers, and a valve member slidably disposed on said piston rod between the piston and the head portion defining the rod end chamber, said valve member being reciprocally shiftable along said piston rod in response to reciprocation of said piston relative to the cylinder during the damped reciprocating displacement in the normal range including restrictive passage means formed thereby and arranged to be in series flow communication with said passage means in said piston in one direction of movement of said piston to provide a greater resistance to fluid flow in one direction between said chambers than in the other direction.

2. The apparatus set forth in claim 1 wherein:
said valve member is movable relative to said piston in the other direction of movement of said piston to provide for communicating said passage means in said piston directly with said one chamber, and said valve member includes a radially extending portion cooperable with said piston to form passage means for directing the flow of fluid radially outwardly and along said borewall of said cylinder member.

3. A suspension apparatus for a vehicle for permitting displacement of wheel support means relative to a frame of said vehicle and for damping said displacement, said apparatus comprising a hydraulic cylinder and piston assembly, including:
an elongated cylinder member defining a wall enclosed longitudinal bore and opposed head portions;
a piston reciprocably disposed for relative bidirectional movement in said bore and dividing said bore into opposed fluid chambers, and a piston rod connected at one end to said piston and extending through one of said chambers and one of said head portions to form a rod end chamber and a second end chamber;
piston rod seal means supported by said cylinder member and including means in fluid sealing engagement with said piston rod to prevent leakage of fluid from said one chamber to the exterior of said apparatus;
a compressible liquid fluid filling the chambers;
means for interconnecting said apparatus between said frame and said wheel support means whereby said piston and piston rod are forced into the cylinder until the fluid is compressed sufficiently in said cylinder member to support the vehicle while permitting displacement of said wheel support means;
flow restriction means for permitting only restricted flow of fluid from one chamber to the other chamber in response to reciprocation of said piston and piston rod with respect to said cylinder member to provide for damped displacement of said wheel support means;
means attached to the piston and piston rod for at least retarding the intermingling of the fluid after the fluid has passed through the restrictive flow means and been heated therein with the major portion of the fluid in the second end chamber while maintaining the heated fluid in heat exchange relationship with the piston member, piston rod and cylinder wall adjacent thereto,
said means for maintaining said heat exchange relationship including passage means defined at least in part by said piston for directing the flow of fluid along the borewall of said cylinder member during movement of said piston to displace fluid from one of said chambers toward the other of said chambers, and
hydraulic cushion means for arresting the movement of said piston as it approaches contact with said one head portion, said cushion means including one of said chambers and a cavity formed by first annular means on said piston rod engageable with a second annular means on said one head portion to form a cavity which upon engagement of said first annular means with said second annular means is hydrualically separated from said one of said chambers to an extent sufficient to establish a lower pressure in said cavity than in said chamber, said cavity being in sufficiently high dynamic fluid communication with said piston rod seal means and with the other of said chambers to prevent dynamic high fluid pressure peaks in said chamber from acting on said piston rod seal means.

4. The apparatus set forth in claim 3 wherein:
said hub means includes means for providing greater restriction to flow of fluid in said one direction, said greater restriction to flow of fluid being provided by said passage means in said hub means in series flow communication with passage means in said piston during movement of said piston rod from said cylinder.

5. The apparatus set forth in claim 4 including:
passage means in said valve member operable to communicate with said passage means in said piston to provide controlled displacement of fluid from said one chamber to cushion the extension of said piston rod when said hub means enters into engagement with said ring seal.

6. The apparatus set forth in claim 3 including:
a metallic elongated cylindrical sleeve extending in sleeved relationship over said cylinder member and having a head at one end connected to said piston rod in heat exchange relationship and forming between said head and said one head portion of said cylinder a pumping chamber open to atmosphere around said cylinder member, the extension and retraction of said piston rod with respect to said cylinder member causing ambient air to be pumped into and out of said pumping chamber, respectively, to transfer heat away from said cylinder member and said piston rod through said cylindrical sleeve.

7. The apparatus set forth in claim 3 including:
resilient pad means secured intervening between said head and said one head portion of said cylinder to cushion the retraction of said piston rod at its retracted limit position.

8. A suspension apparatus for a vehicle for permitting displacement of wheel support means relative to a frame of said vehicle and for damping said displacement, said apparatus comprising
a hydraulic cylinder filled with a compressible liquid under pressure and piston assembly including:
an elongated cylinder member including a longitudinal bore and opposed heat portions;
a piston reciprocably disposed in said bore and dividing said bore into opposed fluid chambers, and a piston rod connected at one end to said piston and extending through one of said chambers and one of said head portions;
piston rod seal means supported by said cylinder member and including means in fluid sealing engagement with said piston rod to prevent leakage of fluid from said one chamber to the exterior of said apparatus;
means for interconnecting said apparatus between said frame and said wheel support means whereby said piston and piston rod are extended and retracted in said cylinder member to provide for damped displacement of said wheel support means; and
means formed by the piston for causing restricted flow of fluid from one chamber to the other chamber in response to reciprocation of said piston and piston rod with respect to said cylinder member and a valve member slidably disposed on said piston rod between the piston and the seal means, said valve member including passage means formed thereby arranged to be in series flow communication with passage means in said piston as the piston moves toward the seal means to provide additional resistance to fluid flow between said chambers when the piston moves toward the seal means than in the other direction of movement of said piston, the valve member being shiftable by differential pressures produced by flow of the liquid past the piston during stroking of the piston.

9. The apparatus set forth in claim 8 wherein:
said valve member is movable relative to said piston in the other direction of movement of said piston to provide for communicating said passage means in said piston directly with said one chamber, and said valve member includes a radially extending flange portion cooperable with said piston to form passage means for directing the flow of fluid radially outwardly toward the borewall of said cylinder member.

10. A suspension apparatus for a vehicle for permitting displacement of wheel support means relative to a frame of said vehicle and for damping said displacement, said apparatus comprising a hydraulic cylinder and piston assembly including:
an elongated cylinder member including a longitudinal bore and opposed heat portions;
a piston reciprocably disposed in said bore and dividing said bore into opposed fluid chambers, and a piston rod connected at one end to said piston and extending through one of said chambers and one of said head portions;
piston rod seal means supported by said cylinder member and including means in fluid sealing engagement with said piston rod to prevent leakage of fluid from said one chamber to the exterior of said apparatus;
means for interconnecting said apparatus between said frame and said wheel support means whereby said piston and piston rod are extended and retracted in said cylinder member to provide for damped displacement of said wheel support means;
means formed by the piston for causing restricted flow of fluid from one chamber to the other chamber in response to reciprocation of said piston and piston rod with respect to said cylinder member and a valve member slidably disposed on said piston rod between the piston and the seal means, said valve member including passage means formed thereby arranged to be in series flow communication with passage means in said piston as the piston moves toward the seal means to provide greater resistance to fluid flow between said chambers when the piston moves toward the seal mean than in the other direction of movement of said piston;
said valve member is movable relative to said piston in the other direction of movement of said piston to provide for communicating said passage means in said piston directly with said one chamber, and said valve member includes a radially extending flange portion cooperable with said piston to form passage means for directing the flow of fluid radially outwardly toward the borewall of said cylinder member; and
hydraulic cushion means for arresting the movement of said piston as it approaches contact with said one head portion, said cushion means including one of said chambers and a cavity formed by first annular means on said piston rod engageable with a second annular means on said one head portion to form a cavity which upon engagement of said first annular means with said second annular means is hydrualically separated from said one of said chambers to an extent sufficient to establish a lower pressure in said cavity than in said chamber, said cavity being in sufficiently high dynamic fluid communication with said piston rod seal means and with the other of said chambers to prevent dynamic high fluid pressure peaks in said chamber from acting on said piston rod seal means.

11. The apparatus set forth in claim 10 including:
passage means in said valve means member operable to communicate with said passage means in said piston to provide controlled displacement of fluid from said one chamber to cushion the extension of said piston rod when said sleeve member enters into engagement with said ring seal.

12. A vibration isolation and damping apparatus particularly useful for a vehicle for permitting displacement of wheel support means relative to a frame of said vehicle and for damping said displacement, said apparatus comprising a hydraulic cylinder and piston assembly including:
an elongated cylinder member including a longitudinal bore and opposed head portions;
a piston reciprocably disposed in said bore and dividing said bore into opposed first and second fluid chambers, and a piston rod connected at one end to said piston and extending through said first chamber and one of said head portions, the volume of the second chamber being substantially greater than the volume of the first to provide a relatively compliant spring constant;
a compressible liquid filling the first and second fluid chambers and being compressed to establish a force tending to expel the rod from the cylinder against a load;
means for causing restricted flow of fluid from one chamber to the other chamber in response to linear extension and retraction of said piston and piston rod with respect to said cylinder; and
means for causing a portion of the fluid flowing from one chamber to the other to be largely confined in heat exchange relationship with the piston and the adjacent portion of the cylinder during normal, less extreme excursions of the piston to produce a zone of substantially elevated temperature having a relatively small volume as compared to the temperature of the significantly relatively larger volume of the second chamber to minimize heating of the bulk of the fluid disposed in said second chamber, whereby a compliant spring force with a relatively high damping ratio in the range of approximately 0.04 to 0.6 can be achieved without materially changing the ride height due to an increase in pressure caused by temperature increase of the liquid.

13. A suspension apparatus for a vehicle for permitting displacement of wheel support means relative to a frame of said vehicle and for damping said displacement, said apparatus comprising a hydraulic cylinder and piston assembly including:

an elongated cylinder member including a longitudinal bore defined by a borewall and opposed head portions;

a piston reciprocably disposed in said bore and dividing said bore into opposed fluid chambers and a piston rod connected at one end to said piston and extending through one of said chambers and one of said head portions;

piston rod seal means supported by said cylinder member and including means in fluid sealing engagement with said piston rod to prevent leakage of fluid from said one chamber to the exterior of said apparatus;

means for causing restricted flow of fluid from one chamber to the other chamber in response to linear extension and retraction of said piston and piston rod with respect to said cylinder member;

means for interconnecting said apparatus between said frame and said wheel support means whereby said piston and piston rod are extended and retracted in said cylinder member to provide for damped displacement of said wheel support means;

passage means defined at least in part by said piston for causing fluid flowing between said chambers to be directed along said borewall into heat exchange contact with said cylinder member to provide for heat transfer away from said fluid to minimize heating of fluid disposed in said cylinder member; and hydraulic cushion means for arresting the movement of said piston toward said one head portion, said cushion means including one of said chambers and cylindrical hub means on said piston rod engageable with a ring seal on said one head portion to form a cavity upon engagement of said hub means with said ring seal, said cavity being in communication with the other of said chambers through said passage means defined by said piston and through passage means formed in said hub means to prevent high fluid pressure from acting on said piston rod seal means.

14. A suspension apparatus for a vehicle for permitting displacement of wheel support means relative to a frame of said vehicle and for damping said displacement, said apparatus comprising a hydraulic cylinder and piston assembly including:

an elongated cylinder member including a longitudinal bore and opposed head portions;

a piston reciprocably disposed in said bore and dividing said bore into opposed fluid chambers and a piston rod connected at one end to said piston and extending through one of said chambers and one of said head portions;

piston rod seal means supported by said cylinder member and including means in fluid sealing engagement with said piston rod to prevent leakage of fluid from said one chamber to the exterior of said apparatus;

means for causing restricted flow of fluid from one chamber to the other chamber in response to linear extension and retraction of said piston and piston rod with respect to said cylinder member;

means for interconnecting said apparatus between said frame and said wheel support means whereby said piston and piston rod are extended and retracted in said cylinder member to provide for damped displacement of said wheel support means;

means for causing fluid flowing between said chambers to be directed along said borewall into heat exchange contact with said cylinder member to provide for heat transfer away from said fluid to minimize heating of fluid disposed in said cylinder member; and hydraulic cushion means for arresting the movement of said piston toward said one head portion, said cushion means including one of said chambers and cylindrical hub means on said piston rod engagement with seal means on said one head portion to form a cavity being in communication with passage means formed in said hub means and opening into the other of said chambers to prevent high fluid pressure from acting on said piston rod seal means.

15. A suspension apparatus for a vehicle for permitting displacement of wheel support means relative to a frame of said vehicle and for damping said displacement, said apparatus comprising a hydraulic cylinder and piston assembly including:

an elongated cylinder member including a longitudinal bore and opposed head portions;

a piston reciprocably disposed in said bore and dividing said bore into opposed fluid chambers, and a piston rod connected at one end to said piston and extending through one of said chambers and one of said head portions;

piston rod seal means supported by said cylinder member and including means in fluid sealing engagement with said piston rod to prevent leakage of fluid from said one chamber to the exterior of said apparatus;

means for interconnecting said apparatus between said frame and said wheel support means whereby said piston and piston rod are extended and retracted in said cylinder member to provide for damped displacement of said wheel support means;

means for causing restricted flow of fluid from one chamber to the other chamber in response to linear extension and retraction of said piston and piston rod with respect to said cylinder member including a valve member slidably disposed on said piston rod between said piston and said one head portion, said valve member including passage means formed therein and arranged to be in series flow communication with passage means in said piston in one direction of movement of said piston to provide greater resistance to fluid flow between said chambers than in the other direction of movement of said piston; and hydraulic cushion means for arresting the movement of said piston toward said one head portion, said cushion means including a hub portion of said valve member engageable with seal means on said one head portion to form a cavity upon engagement of said hub portion with said seal means on said one head portion, said cavity being in communication with said passage means in said piston through passage means formed in said hub portion to prevent high fluid pressure from acting on said piston rod seal means.

16. The apparatus set forth in claim 15 including;

passage means in said valve member operable to communicate with said passage means in said piston to provide controlled displacement of fluid from said one chamber to cushion the extension of said piston rod when said valve member enters into engagement with said seal means on said one head portion.

17. A suspension apparatus for a vehicle for permitting bounce and rebound displacement of wheel support means relative to a frame of said vehicle and for damping said displacement, said apparatus comprising:

an elongated cylinder member including a longitudinal bore and first and second opposite end closure means;

piston means reciprocably disposed in said bore and dividing said bore into first and second chambers, said chambers each being filled with a confined compressible liquid;

piston rod means coupled to said piston and extending through at least the first end closure means, the piston rod means having a greater diameter in said first chamber than in said second chamber whereby as the piston is moved toward the second chamber the liquid is compressed;

piston rod seal means supported by at least one of the end closures and in fluid sealing engagement with the piston rod to prevent leakage of fluid from the chambers to the exterior of said apparatus;

means for interconnecting said apparatus between said frame and said wheel support means whereby said piston and piston rod are extended and retracted in said cylinder member to provide for bound and rebound displacement of said wheel support means whereby displacement of the rod as it is stroked from the first chamber of the cylinder by the weight of the vehicle toward the second chamber will compress the liquid to provide a reactive spring force supporting the vehicle while permitting reciprocating movement of the wheel relative to the vehicle body as the vehicle traverses uneven terrain; and the total volume of liquid in the second chamber being substantially greater than that in the first chamber to provide a desired spring rate;

damping means for providing controlled flow of fluid between the chambers in response to reciprocation of the piston means within the cylinder, said damping means comprising fluid passageway means formed by the piston means providing resistance to fluid flow from the second end chamber to the first end chamber of a first magnitude sufficient to produce a first damping force during the bounce stroke and a second resistance to fluid flow from the first end chamber to the second end chamber greater than the first resistance and sufficient to produce a second damping force during the rebound stroke significantly greater in magnitude than the first damping force, a portion of the second pressure drop being caused by liquid passageways for restricting the flow of the liquid therethrough spaced from the point at which the liquid passing through the piston mingles with the liquid in the second chamber, the liquid passageways including a zone of decreased cross sectional area for producing a pressure drop followed by a zone of substantially increased cross sectional area and volume to increase retention time followed by a zone of decreased cross sectional area to limit intermingling between the increased volume zone and fluid in the second chamber, whereby the liquid heated by friction during bounce will be largely confined in the passageways and first end chamber during normal operation and be transferred to the structure forming the passageways before intermixing with the major portion of the liquid in the second chamber during a substantial rebound stroke.

18. The suspension apparatus of claim 17 wherein the damping means comprises:

a piston member fixed to the rod means for movement therewith having fluid passageways therethrough for providing the first damping force on the bounce stroke; and means movable axially of the piston rod means and disposed between the piston member and the first chamber and movable toward the piston member in response to the rebound stroke for increasing the resistance to flow of liquid from the first chamber by the piston member to the second chamber to produce the second damping force during the rebound stroke.

19. A suspension for a vehicle for permitting displacement of wheel support means relative to a frame of said vehicle and for damping said displacement, said apparatus comprising a hydraulic cylinder and piston assembly including:

an elongated cylinder member including a longitudinal bore and opposed head portions;

a piston reciprocably disposed in said bore and dividing said bore into opposed fluid chambers, and a piston rod connected at one end to said piston and extending through one of said chambers and one of said head portions;

piston rod seal means supported by said cylinder member and including means in fluid sealing engagement with said piston rod to prevent leakage of fluid from said one chamber to the exterior of said apparatus;

means for interconnecting said apparatus between said frame and said wheel support means whereby said piston and piston rod are extended and retracted in said cylinder member within a normal range generally centered about the normal ride height to provide for damped displacement of said wheel support means; and means for causing restricted flow of fluid from one chamber to the other chamber in response to reciprocation of said piston and piston rod with respect to said cylinder member within the normal ranges including a first set of fluid passageways through the piston and a valve member slidably disposed on said piston rod between the piston and the piston rod seal means, said valve member including passage means formed thereby and arranged to be in series flow communication with passage means in said piston during movement of said piston toward the piston rod seal means to provide greater resistance to fluid flow between said chambers when the piston is moving toward the rod seal means than in the other direction of movement of said piston.

20. A suspension apparatus for a vehicle for permitting displacemnt of wheel support means relative to a frame of said vehicle and for damping said displacement, said apparatus comprising a hydraulic cylinder and piston assembly including:

an elongated cylinder member including a longitudinal bore and opposed head portions;

a piston means reciprocably disposed in said bore and dividing said bore into opposed first and second fluid chambers, and a piston rod connected at one end to said piston and extending through the first chamber and one of said head portions;

a compressible liquid filling the first and second chambers;

piston rod seal means supported by said cylinder member and including means in fluid sealing engagement with said piston rod to prevent leakage of fluid from the first chamber to the exterior of said apparatus;

the piston means including means for permitting restricted flow of fluid between the chambers in response to reciprocation of said piston and piston rod with respect to said cylinder member;

means for interconnecting said apparatus between said frame and said wheel support means whereby said piston and piston rod are forced into the cylinder to provide a reaction spring force for supporting the vehicle while providing for displacement of said wheel support means;

means associated with the piston for reducing mixing of the heated fluid flowing through the means for causing restricted flow of fluid during normal reciprocation of the piston with the major portion of the liquid in the second chamber including means traveling with the piston forming a zone of relatively increased volume and low velocity between a high velocity zone causing pressure drop and damping and a restricted opening communicating with the second chamber whereby the liquid in the vicinity of the piston, rod and adjacent cylinder will be primarily heated and the heat transferred away from the fluid through said members with minimum change of volume of the liquid due to heat generated by the flow restricting means during operation to reduce change in normal average position of the piston during operation.

21. The suspension apparatus of claim 20 wherein the means for reducing mixing of the heated fluid from the remainder of the fluid in the second chamber includes baffle means connected to the piston and spaced therefrom to define a subchamber movable with the piston, the subchamber being in fluid communication with the fluid in the remainder of the chamber through restricted opening means.

22. A suspension apparatus for a vehicle for permitting displacement of wheel support means relative to a frame of said vehicle and for damping said displacement, said apparatus comprising:

an elongated cylinder member including a longitudinal bore and a rod end closure and a second end closure;

piston means reciprocably disposed in said bore and dividing said bore into a rod end chamber adjacent the rod end closure and a second end chamber adjacent the second end closure, said chambers being filled with a confined compressible liquid, a piston rod connected at one end to said piston means and extending through the rod end closure;

piston rod seal means supported by the rod end closure and in fluid sealing engagement with the piston rod to prevent leakage of fluid from the rod end chamber to the exterior of said apparatus;

means for interconnecting said apparatus between said frame and said wheel support means whereby said piston and piston rod are extended and retracted in said cylinder member to provide for displacement of said wheel support means whereby displacement of the rod as it is stroked into the cylinder by the weight of the vehicle will compress the liquid to provide a reactive spring force supporting the vehicle while permitting reciprocating movement of the wheel relative to the vehicle body as the vehicle transverses uneven terrain; and means forming a resilient liquid cushion for reducing the impact of the piston means against the rod end closure upon unloaded extension of the apparatus including means on the piston means acting in cooperation with means on the rod end closure to confine a limited volume of the liquid to produce an increased pressure acting to retard the progress of the piston means toward the end closure means including means for venting the pressure of the liquid acting on the piston rod seal means to the liquid on the other side of the piston means to reduce the peak pressure acting on the seal means as compared to the pressure of the liquid cushion.

23. A system for producing a spring force under load conditions comprising:

hydraulic cylinder means having at least one rod end, rod means extending through the rod end having a seal portion of constant diameter for reciprocation through the rod end and forming piston means within the cylinder having a larger diameter than the seal portion and dividing the cylinder means into a first chamber around the seal portion and a second chamber on the opposite side of the piston means, seal means forming an annular, sliding fluid seal between the cylinder and the seal portion of the end, a compressible liquid under pressure within the cylinder for producing a spring force tending to force the rod means out of the cylinder means to thereby counteract a load tending to force the rod means into the cylinder means, the rod means and piston cooperating with the cylinder means to form a zone of progressively increasing pressure as the piston approaches the rod end of the cylnder means at velocity resulting from a decreased load condition for progressively increasing the rate of deceleration of the piston means before impact with the cylinder means, and fluid control means associated with the rod means and cylinder means for preventing pressure acting on the seal means from increasing at the same rate as the pressure acting to decelerate the piston means after the rod means has reached a predetermrined position of travel relative to the rod end to thereby limit the pressure acting on the seal while maintaining the higher pressure acting to prevent travel of the rod means to prevent damaging mechanical contact between the piston and cylinder in response to a sudden reduced load condition.

24. The system of claim 23 wherein the fluid control means comprises means for establishing, at the predetermined position of travel, high and low pressure zones between the piston and rod end, the high pressure zone acting on an area of the piston and a generally corresponding area of the rod end of the cylinder, the low pressure zone acting on an area of the piston and the seal means, and port means for passing fluid from the low pressure zone past the piston to the second chamber, such that the buildup of pressure in the high pressure zone is at a greater rate than the buildup of pressure in the low pressure zone.

25. The system of claim 23 wherein the fluid control means comprises means for establishing, at the predetermined position of travel, high and low pressure zones between the piston and rod end, the high pressure zone acting on an area of the piston and a generally corresponding area of the rod end of the cylinder, the low pressure zone acting on an area of the piston and the seal means, first port means for passing fluid from the high pressure zone past the piston to the second chamber, second port means for passing fluid from the low pressure zone past the piston to the second chamber, the first and second port means being sized relative to the volumes of the high and low pressure zones such that the buildup of pressure in the high pressure zone is at a greater rate than the buildup of pressure in the low pressure zone.

26. A suspension apparatus for a vehicle for permitting displacement of wheel support means relative to a frame of said vehicle and for damping said displacement, said apparatus comprising a hydraulic cylinder and piston assembly, including:

an elongated cylinder member defining a wall enclosed longitudinal bore and opposed head portion;

a piston reciprocably disposed for relative bidirectional movement in said bore and dividing said bore into opposed fluid chambers, and a piston rod connected at one end to said piston and extending through one of said chambers and one of said head portions to form a rod end chamber and a second end chamber;

piston rod seal means supported by said cylinder member and including means in fluid sealing engagement with said piston rod to prevent leakage of fluid from said one chamber to the exterior of said apparatus;

a compressible liquid fluid filling the chambers;

means for interconnecting said apparatus between said frame and said wheel support means whereby said piston and piston rod are forced into the cylinder until the fluid is compressed sufficiently in said cylinder member to support the vehicle while permitting displacement of said wheel support means;

hydraulic cushion means for arresting the movement of said piston as it approaches contact with said one head portion, said cushion means including one of said chambers and a cavity formed by first annular means on said piston rod engageable with a second annular means on said one head portion to form a cavity which upon engagement of said first annular means with said second annular means is hydrualically separated from said one of said chambers to an extent sufficient to establish a lower pressure in said cavity than in said chamber, said cavity being in sufficiently high dynamic fluid communication with said piston rod seal means and with the other of said chambers to prevent dynamic high fluid pressure peaks in said chamber from acting on said piston rod seal means.

27. The apparatus set forth in claim 26 wherein:
said hub means includes a valve member for providing greater restriction to flow of fluid in said one direction, said greater restriction to flow of fluid being provided by said passage means in said hub means in series flow communication with passage means in said piston during movement of said piston rod from said cylinder.

28. The apparatus set forth in claim 27 including:
passage means in said valve member operable to communicate with said passage means in said piston to provide controlled displacement of fluid from said one chamber to cushion the extension of said piston rod when said hub means enters into engagement with said ring seal.

* * * * *

UNITED STATES PATENT AND TRADEMARK OFFICE
CERTIFICATE OF CORRECTION

PATENT NO. : 4,735,402
DATED : April 5, 1988
INVENTOR(S) : Leo W. Davis

It is certified that error appears in the above-identified patent and that said Letters Patent is hereby corrected as shown below:

Col. 2, line 9, "road" should be --rod--.

Col. 2, line 15, "coponent" should be --component--.

Col. 3, line 45, "alog" should be --along--.

Col. 7, line 10, "100" should be --110--.

Col. 7, line 47, "radically" should be --raidally--.

Col. 10, line 58, "in" should be --into--.

Col. 13, line 57, "psiton" should be --piston--.

Col. 20, line 61, "0.04" should be --0.4--.

Col. 26, line 38, "cylnder" should be --cylinder--.

Col. 26, line 46, "predetemrined" should be --predetermined--.

Signed and Sealed this

Twentieth Day of September, 1988

*Attest:*

DONALD J. QUIGG

*Attesting Officer*     *Commissioner of Patents and Trademarks*